United States Patent
Han

(10) Patent No.: US 10,184,537 B2
(45) Date of Patent: Jan. 22, 2019

(54) METHOD AND APPARATUS FOR MEASURING CLUTCH DURABILITY OF ALL WHEEL DRIVE VEHICLE

(71) Applicant: HYUNDAI DYMOS INCORPORATED, Seosan-si, Chungcheongnam-do (KR)

(72) Inventor: Sang Chull Han, Hwaseong-si (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 68 days.

(21) Appl. No.: 15/372,527

(22) Filed: Dec. 8, 2016

(65) Prior Publication Data
US 2017/0167557 A1 Jun. 15, 2017

(30) Foreign Application Priority Data
Dec. 15, 2015 (KR) .................. 10-2015-0179621

(51) Int. Cl.
*F16D 66/00* (2006.01)
*B60K 17/02* (2006.01)
(Continued)

(52) U.S. Cl.
CPC ......... *F16D 66/021* (2013.01); *F16D 66/026* (2013.01); *B60K 17/02* (2013.01);
(Continued)

(58) Field of Classification Search
CPC .............. F16D 66/021; F16D 66/026; F16D 2066/006; F16D 2066/008; B60K 17/02;
(Continued)

(56) References Cited

U.S. PATENT DOCUMENTS

| 2003/0036837 | A1* | 2/2003 | Katayama | .......... B60K 23/0808 701/69 |
| 2007/0039770 | A1* | 2/2007 | Barrette | ................ B60W 10/06 180/197 |
| 2009/0205895 | A1* | 8/2009 | Blais | ...................... B62K 25/16 180/223 |

FOREIGN PATENT DOCUMENTS

| JP | 2004-293629 A | 10/2004 | |
| JP | 2004293629 A | * 10/2004 | ............. F16H 61/14 |

(Continued)

OTHER PUBLICATIONS

Korean Office Action dated Sep. 18, 2017 from the corresponding Korean Application No. 10-2015-0179621, 2 pp.

*Primary Examiner* — Behrang Badii
*Assistant Examiner* — Daniel L Greene
(74) *Attorney, Agent, or Firm* — Brinks Gilson & Lione

(57) ABSTRACT

The present disclosure provides a method for measuring clutch durability of an all wheel drive vehicle. The method includes: a damage degree securing step of accumulating and acquiring a damage degree of a clutch based on a clutch slip amount and clutch transfer torque when the clutch slips by a difference in rotary speed between a front wheel and a rear wheel; and a durability predicting step of predicting current durability of the clutch based on the difference between the accumulated and acquired damage degree and a reference damage degree of the corresponding clutch, an input shaft RPM of rotating the clutch, and a reference durability RPM of the clutch.

6 Claims, 2 Drawing Sheets

Figure 1:
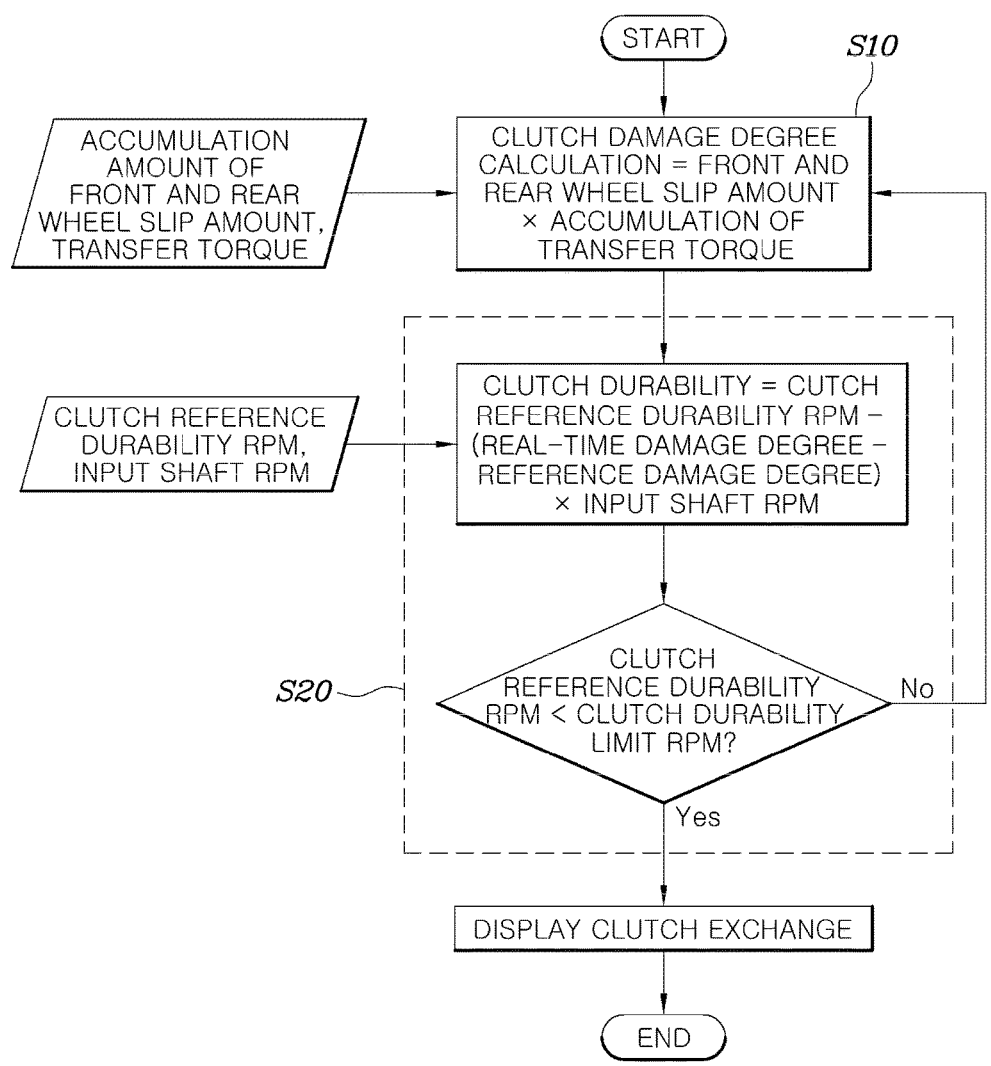

(51) Int. Cl.
 *G07C 5/08* (2006.01)
 *F16D 66/02* (2006.01)

(52) U.S. Cl.
 CPC ..... *B60Y 2302/03* (2013.01); *F16D 2066/006* (2013.01); *F16D 2066/008* (2013.01); *G07C 5/0808* (2013.01); *G07C 5/0816* (2013.01)

(58) Field of Classification Search
 CPC . B60Y 2302/03; G07C 5/0808; G07C 5/0816
 See application file for complete search history.

(56) References Cited

FOREIGN PATENT DOCUMENTS

| | | | | |
|---|---|---|---|---|
| JP | 2006044549 A | * | 2/2006 | ........... B60K 17/356 |
| JP | 2014-084879 A | | 5/2014 | |
| JP | 2014-169750 A | | 9/2014 | |
| KR | 10-1998-0002959 | | 3/1998 | |
| KR | 10-1998-0030422 | | 7/1998 | |
| KR | 10-1996-0011192 | | 4/1999 | |
| KR | 10-2005-0091717 A | | 9/2005 | |
| KR | 10-2008-0031683 | | 4/2008 | |
| KR | 10-0897096 | | 5/2009 | |
| KR | 10-2014-0048005 A | | 4/2014 | |
| KR | 10-2014-0078442 | | 6/2014 | |

* cited by examiner

METHOD AND APPARATUS FOR MEASURING CLUTCH DURABILITY OF ALL WHEEL DRIVE VEHICLE

CROSS-REFERENCE TO RELATED APPLICATION

This application claims priority to and the benefit of Korean Patent Application No. 10-2015-0179621, filed on Dec. 15, 2015, which is incorporated herein by reference in its entirety.

FIELD

The present disclosure relates to a clutch of an all wheel drive vehicle and a method for measuring clutch durability of an all wheel drive vehicle.

BACKGROUND

The statements in this section merely provide background information related to the present disclosure and may not constitute prior art.

An all wheel drive method of a vehicle driving both front and rear vehicle shafts may be generally divided into two types: a switched all wheel drive type and a continuous all wheel drive type.

The switched all wheel drive continuously drives only one vehicle shaft and transfers drive force to the residual vehicle shafts only if required, and the continuous all wheel drive continuously drives all wheels by the drive force of an engine.

Meanwhile, in an on-demand type all wheel drive system, durability of a clutch is generally designed to coincide with durability of a power transmissions system, but a damage degree of the clutch varies depending on a used load in an actual use area, and as a result, the durability of the clutch may be shorter than durability as designed.

In particular, when a slip amount and transfer torque of the clutch exceed a durability design criterion, the durability of the clutch is shorter than the designed durability by 10 to 15% so that unexpected situations which may occur while a vehicle is actually driven cannot be properly prepared. Under the situations, we have discovered that it is difficult to accurately measure actual durability of the clutch and in particular, when the vehicle is continuously driven as being deviated from a durability limit of the clutch, a damage risk of the clutch degrades power transmission performance in the all wheel drive system, of course.

The above information disclosed in this Background section is only for enhancement of understanding of the background of the present disclosure and therefore it may contain information that does not form the prior art that is already known to a person of ordinary skill in the art.

SUMMARY

The present disclosure addresses the problems described above and provides a method and an apparatus for measuring clutch durability of an all wheel drive vehicle which accurately predicts durability of a clutch by deriving damage to a clutch through a clutch slip amount and clutch transfer torque and by reflecting an added and subtracted damage degree value into calculation of the clutch durability.

In one form of the present disclosure, a method for measuring clutch durability of an all wheel drive vehicle includes: a damage degree securing step of accumulating and acquiring a damage degree of a clutch based on a clutch slip amount and clutch transfer torque when the clutch slips by a difference in rotary speed between a front wheel and a rear wheel; and a durability predicting step of predicting current durability of the clutch based on the difference between the accumulated and acquired damage degree and a reference damage degree of the corresponding clutch, an input shaft revolution per minute (RPM) of rotating the clutch, and a reference durability RPM of the clutch.

In the damage degree securing step, when the clutch slips, the damage degree is acquired by multiplying the clutch slip amount per time by the clutch transfer torque per time, and the damage degree is continuously accumulated to acquire the accumulated damage degree.

In the durability predicting step, a damage degree difference value is acquired by adding or subtracting the reference damage degree of the corresponding clutch to or from the accumulated damage degree, the damage degree difference value is multiplied by the input shaft RPM, and the multiplied value is subtracted from the reference durability RPM of the clutch to determine the durability of the clutch.

In the durability predicting step, when the value acquired by multiplying the damage degree difference value by the input shaft RPM reaches a clutch reference durability RPM, a cutch exchange warning may be generated.

In the durability predicting step, when the accumulated damage degree reaches approximately 100%, the clutch exchange warning may be generated regardless of the input shaft RPM.

The clutch reference durability RPM may be a reference durability PRM corresponding to a new clutch.

Another exemplary form of the present disclosure provides an apparatus for measuring clutch durability of an all wheel drive vehicle. The apparatus includes: a control unit configured to accumulate and acquire a damage degree of a clutch based on a clutch slip amount and clutch transfer torque when the clutch slips by the difference in rotary speed between a front wheel and a rear wheel. In particular, the control unit is configured to predict current durability of the clutch based on a difference between the accumulated and acquired damage degree and a reference damage degree of the corresponding clutch, an input shaft RPM of rotating the clutch, and a reference durability RPM of the clutch.

Through the technical solution provided by the present disclosure, durability of a clutch is predicted by adding or subtracting an accumulation damage degree larger or smaller than a reference damage degree of the clutch to or from the durability of the clutch to more accurately measure actual durability of the clutch, and as a result, a damage risk of the clutch is inhibited or prevented, and power transmission performance in an all wheel drive system is enhanced.

Further areas of applicability will become apparent from the description provided herein. It should be understood that the description and specific examples are intended for purposes of illustration only and are not intended to limit the scope of the present disclosure.

DRAWINGS

Figure 2:
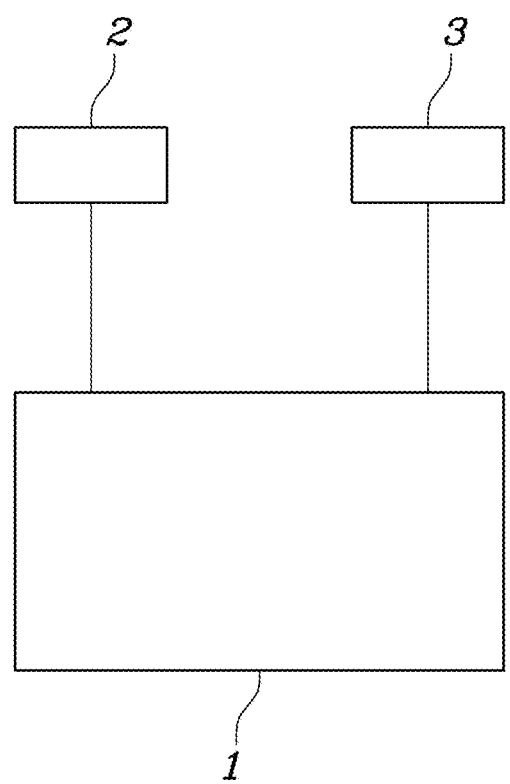

In order that the disclosure may be well understood, there will now be described various forms thereof, given by way of example, reference being made to the accompanying drawings, in which:

FIG. 1 is a diagram for describing a flow of a method for measuring clutch durability; and FIG. 2 is a diagram schematically illustrating a configuration of an apparatus for measuring clutch durability.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram for describing a flow of a method for measuring clutch durability in one form of the present disclosure, and FIG. 2 is a diagram schematically illustrating a configuration of an apparatus for measuring clutch durability in one form of the present disclosure.

The method for measuring clutch durability in one form of the present disclosure is generally configured to include a damage degree securing step (S10) and a durability predicting step (S20).

Referring to FIGS. 1 and 2, the damage degree securing step (S10) is to accumulate and acquire a damage degree of the clutch based on a clutch slip amount and clutch transfer torque when the clutch slips by a difference in rotary speed between a front wheel and a rear wheel. The durability predicting step (S20) is to predict current durability of the clutch based on a difference between the accumulated and acquired damage degree and a reference damage degree of the corresponding clutch, an input shaft RPM of rotating the clutch, and a reference durability RPM of the clutch.

For example, rotary speeds of the front wheel and the rear wheel are measured through wheel speed sensors 2 and 3 provided in the front wheel and the rear wheel to be input into a control unit 1.

In particular, the damage degree is acquired by considering the clutch transfer torque whenever the clutch slips and the acquired damage degree is continuously accumulated to acquire the current accumulated damage degree of the clutch.

Accordingly, durability of a clutch is predicted by adding/subtracting an damage degree larger or smaller than a reference damage degree of the clutch to/from the durability of the clutch to more accurately recognize actual durability of the clutch, and as a result, a damage risk of the clutch is inhibited or prevented and power transmission performance in an all wheel drive system is enhanced.

In the present disclosure, in the damage degree securing step (S10), when the clutch slips, the damage degree is acquired by multiplying the clutch slip amount per time by the clutch transfer torque per time, and the damage degree is continuously accumulated to acquire the accumulated damage degree.

That is, the clutch damage degree is acquired by multiplying the clutch slip amount per time by the clutch transfer torque per time, and the acquired clutch damage degree is continuously accumulated whenever the clutch slips to acquire a real-time damage degree.

Damage degree data for each situation is previously secured by performing a durability test for each of various situational conditions of the clutch slip amount and the clutch transfer torque to convert a value acquired by multiplying the clutch slip amount per time of the corresponding clutch by the clutch transfer torque per time into the damage degree through the data.

Further, the reference damage degree may be derived while inspecting a durability distance of the clutch through a test under a predetermined condition (a slip speed, transfer torque, and the like) and the value derived through the test is converted into the damage degree to be set and besides, the reference damage degree will be able to set through various methods.

That is, a predetermined reference damage degree and the accumulation damage degree which is measured in real time are compared with each other and when the accumulation damage degree is larger or smaller than the reference damage degree, the damage degree is added or subtracted and used, and as a result, a use situation of the clutch is actively reflected to predicting the durability of the cutch. Therefore, actual durability of the clutch may be more accurately measured.

In the durability predicting step (S20), a damage degree difference value is acquired by adding/subtracting the reference damage degree of the corresponding clutch to/from the accumulated damage degree, the damage degree difference value is multiplied by the input shaft RPM, and the multiplied value is subtracted from the reference durability RPM of the clutch to determine the durability of the clutch.

That is, the equation to acquire the clutch durability is: clutch durability=reference durability RPM of clutch−{(real-time accumulation damage degree−reference damage degree)*input shaft RPM}.

Herein, the clutch reference durability RPM as the reference durability RPM corresponding to a new clutch is a value for each clutch and the input shaft RPM and the input shaft RPM is a total RPM of an input shaft in which power is transferred from an engine to rotate the clutch.

In detail, in the durability predicting step (S20), when the value acquired by multiplying the damage degree difference value by the input shaft RPM reaches the reference durability RPM, it is determined that the durability of the clutch reaches a durability limit of the clutch to generate a clutch exchange warning.

On the contrary, when the value acquired by multiplying the damage degree value by the input shaft RPM does not reach the clutch reference durability RPM, it is determined that the durability of the clutch may not reach the durability limit of the clutch.

That is, at the time of determining the durability limit of the clutch by comparing the input shaft PRM and the RPM of the clutch reference durability RPM, the damage degree difference value to which the actual use situation of the clutch is reflected is additionally reflected to more accurately predict the durability of the clutch, and as a result, an exchange time of the clutch may be more accurately determined.

However, in the durability predicting step (S20), when the accumulated damage degree reaches approximately 100%, the clutch exchange warning may be generated regardless of the input shaft RPM.

For example, when the clutch slips, in a specific situation in which the clutch transfer torque excessively increases, and when the damage degree of the clutch rapidly increases and the accumulation damage degree reaches approximately 100%, even though the input shaft RPM used for driving is low and the input shaft RPM may not reach the clutch reference durability RPM by the calculation, it is determined that the clutch has already reached the durability limit to generate the clutch exchange warning.

Meanwhile, referring to FIG. 2, the method for measuring clutch durability is configured to include the damage degree securing step of accumulating and acquiring the damage degree of the clutch based on the clutch slip amount and the clutch transfer torque when the clutch slips by the difference in rotary speed between the front wheel and the rear wheel;

and the durability predicting step of predicting the current durability of the clutch based on the difference between the accumulated and acquired damage degrees and the reference damage degree of the corresponding clutch, the input shaft RPM of rotating the clutch, and the reference durability RPM of the clutch.

Herein, the control unit 1 may be an electronic control unit (ECU) and the durability of the clutch may be predicted through the calculation in the control unit 1.

Hereinabove, detailed examples of the present disclosure have been described in detail, but it is apparent to those skilled in the art that various changes and modifications can be made within the scope of the technical spirit of the present disclosure.

What is claimed is:

1. A method for measuring clutch durability of an all wheel drive vehicle, the method comprising:
 a damage degree securing step of accumulating and acquiring a damage degree of a clutch based on a clutch slip amount and a clutch transfer torque when the clutch slips by a difference in rotary speed between a front wheel and a rear wheel; and
 a durability predicting step of predicting current durability of the clutch based on a difference between the accumulated and acquired damage degree and a reference damage degree of a corresponding clutch, an input shaft revolution per minute (RPM) of rotating the clutch, and a reference durability RPM of the clutch,
 wherein in the durability predicting step, a damage degree difference value is acquired by subtracting the reference damage degree of the corresponding clutch from the accumulated damage degree, the damage degree difference value is multiplied by the input shaft RPM, and a multiplied value is subtracted from the reference durability RPM of the clutch to determine the durability of the clutch,
 wherein the durability of the clutch is calculated as:

clutch durability=reference durability RPM of the clutch−{(real-time accumulation damage degree−reference damage degree)×input shaft RPM}.

2. The method of claim 1, wherein in the damage degree securing step, when the clutch slips, the damage degree is acquired by multiplying the clutch slip amount per time by the clutch transfer torque per time, and the damage degree is continuously accumulated to acquire the accumulated damage degree.

3. The method of claim 1, wherein in the durability predicting step, when the value acquired by multiplying the damage degree difference value by the input shaft RPM reaches the reference durability RPM of the clutch, a clutch exchange warning is generated.

4. The method of claim 1, wherein in the durability predicting step, when the accumulated damage degree reaches approximately 100%, a clutch exchange warning is generated regardless of the input shaft RPM.

5. The method of claim 1, wherein the reference durability RPM of the clutch is a reference durability RPM corresponding to a new clutch.

6. An apparatus for measuring clutch durability of an all wheel drive vehicle, the apparatus comprising:
 a control unit configured to accumulate and acquire a damage degree of a clutch based on a clutch slip amount and a clutch transfer torque when the clutch slips by a difference in rotary speed between a front wheel and a rear wheel,
 wherein the control unit is configured to predict current durability of the clutch based on a difference between the accumulated and acquired damage degree and a reference damage degree of a corresponding clutch, an input shaft RPM of rotating the clutch, and a reference durability RPM of the clutch,
 wherein the control unit determines the durability of the clutch by using the following equation:

clutch durability=reference durability RPM of the clutch−{(real-time accumulation damage degree−reference damage degree)×input shaft RPM}.

* * * * *